(12) United States Patent
Mandela et al.

(10) Patent No.: US 12,051,895 B2
(45) Date of Patent: Jul. 30, 2024

(54) AUXILIARY CIRCUIT TO INJECT FAULT CURRENT DURING GRID FAULTS

(71) Applicant: BLOOM ENERGY CORPORATION, San Jose, CA (US)

(72) Inventors: Chaitanya Mandela, San Jose, CA (US); Prasad Pmsvvsv, San Jose, CA (US); Ranganathan Gurunathan, San Jose, CA (US); Vishal A. Gopalakrishnan, San Jose, CA (US); Ponkiran Ponnappan, San Jose, CA (US)

(73) Assignee: BLOOM ENERGY CORPORATION, San Jose, CA (US)

( * ) Notice: Subject to any disclaimer, the term of this patent is extended or adjusted under 35 U.S.C. 154(b) by 0 days.

(21) Appl. No.: 18/493,557

(22) Filed: Oct. 24, 2023

(65) Prior Publication Data
US 2024/0146050 A1 May 2, 2024

(30) Foreign Application Priority Data
Oct. 26, 2022 (IN) .............................. 202241060993

(51) Int. Cl.
*H02H 7/122* (2006.01)
*H02J 3/00* (2006.01)

(52) U.S. Cl.
CPC ........... *H02H 7/122* (2013.01); *H02J 3/0012* (2020.01)

(58) Field of Classification Search
CPC ................................ H02J 3/0012; H02H 7/122
See application file for complete search history.

(56) References Cited

U.S. PATENT DOCUMENTS 6,633,092 B2 * 10/2003 Dahler ............... H02J 3/1814
307/45
2023/0261472 A1 * 8/2023 Fukasawa ............ H02J 3/38
307/69

FOREIGN PATENT DOCUMENTS

CN 103280793 A * 9/2013
CN 112769116 A 5/2021

OTHER PUBLICATIONS

HVDC Fault Current Interruption Technology, R.P.P. Smeets, N.A. Belda, 2019, pp. 1-2, Netherlands.
Full-power test of HVDC circuit-breakers with AC short-circuit generators operated at low power frequency, Nadew A. Belda, Cornelis A. Plet, Rene P. P. Smeets, , 2019, pp. 1-2.

* cited by examiner

*Primary Examiner* — Harry R Behm
(74) *Attorney, Agent, or Firm* — Evergreen Valley Law Group; Kanika Radhakrishnan

(57) ABSTRACT

An auxiliary circuit to inject fault current to a grid is provided. The circuit includes a pair of transformers including a first transformer and a second transformer, and a pair of SCRs including a first SCR and a second SCR. Each SCR remains in an OFF state and an ON state when AC voltage of the grid is in normal range and fault range, respectively. The circuit includes a capacitor electrically connected between the first transformer, the second transformer, and the first SCR. The circuit includes a diode biased by the second transformer and the capacitor to enable charging of the capacitor to a peak of AC voltage during one polarity of AC voltage when the AC voltage is in normal range. The capacitor discharges via the first SCR and the first transformer by injecting the fault current into the grid when the AC voltage is in the fault range.

19 Claims, 10 Drawing Sheets

AUXILIARY CIRCUIT TO INJECT FAULT CURRENT DURING GRID FAULTS

TECHNICAL FIELD

The present disclosure relates generally to power control systems and devices and, more particularly, to an auxiliary circuit to inject fault current into a grid during grid faults.

BACKGROUND

Renewable energy is currently a preferred resource for power generation technology due to its environmental benefits, economic benefits, energy security, etc. Renewable energy technologies are used to provide electric power from renewable energy sources to an electrical power grid. In addition, renewable energy sources are also in demand to directly power electrical loads at homes, offices, industries, etc. Such sources are used as a part of electrical systems such as energy storage units, emergency backup power systems, off-grid systems, microgrids, distributed generation systems, etc., that are preferred in case the supply from the electrical grid stops or experiences some disturbances.

Some renewable energy sources such as solar, fuel cell systems, etc., generate direct current (DC) power. In some scenarios, the DC power needs to be converted into alternating current (AC) power before providing the AC power to the grid and/or to some of the above-mentioned electrical systems. Therefore, inverters are associated/connected with the energy sources for the conversion of DC power to AC power. Moreover, the sources and their associated inverters are connected to the grid via circuit breakers for safety purposes, fault isolation, disconnecting power for maintenance and servicing of the inverter or other system components, grid stability, compliance with codes and standards, and the like.

Typically, inverters connected to the grid have limited output current capabilities (typically 1.5-2 times the nominal current) under the occurrence of faults in the grid such as short circuits. Further, the current capabilities of the inverters are much less compared to synchronous generators that can typically cater up to 7-8 times the nominal current based on their short circuit impedance. Further, under grid faults such as L-N/L-L/L-L-N shorts, enough current should be supplied to the fault such that the breaker/fuse at the fault location opens. As inverters have limited capabilities in terms of short circuit current ratings mainly due to the current ratings of the power electronic devices, additional circuits shall be used to inject current only during grid fault conditions.

Conventionally, most of the grid-connected inverter-based sources would isolate themselves by injecting additional current only onto the circuit breaker they are connected to and not to the circuit breaker at the fault location, when they detect a fault in the grid. This isolation from the grid is performed by connecting a DC source or a charged capacitor across the circuit breaker and triggering it through a static switch (generally SCR or GTO due to their high current handling capabilities) such that inverter hardware is isolated during grid faults. This is detrimental to the safety and reliability of the grid as the grid would ideally want all the sources connected to it to supply fault current (typically called voltage ride-through (VRT)).

Therefore, there is a need for an improved circuit in addition to the inverter which is a current-limited source to inject sufficient fault current into the grid when a fault occurs in the grid.

SUMMARY

Various embodiments of the present disclosure describe an auxiliary circuit to inject fault current into the grid and safely operate the auxiliary circuit with minimal stress on the circuit elements.

In one embodiment, an auxiliary circuit to inject fault current into a grid is provided. The auxiliary circuit includes a pair of transformers including a first transformer and a second transformer. Further, the auxiliary circuit includes a pair of silicon-controlled rectifiers (SCRs) including a first SCR and a second SCR. Each of the pair of SCRs is configured to be in an OFF state when alternating current (AC) voltage of the grid is in a normal range and each of the pair of SCRs is configured to be in an ON state when the AC voltage is in a fault range. Furthermore, the auxiliary circuit includes a capacitor electrically connected between the first transformer, the second transformer, and the first SCR. Thereafter, the auxiliary circuit includes a diode biased by the second transformer and the capacitor to enable charging of the capacitor to a peak of the AC voltage during one polarity of the AC voltage when the AC voltage is in the normal range. The capacitor is configured to discharge via the first SCR and the first transformer by injecting the fault current into the grid when the AC voltage is in the fault range.

In another embodiment, an electrical network is provided. The network includes one or more inverters, where each of the one or more inverters is connected to a grid via a circuit breaker. Further, the network includes an auxiliary circuit connected to a node connecting the circuit breaker to the inverter, where the auxiliary circuit is configured to inject fault current into the grid. The auxiliary circuit includes a pair of transformers including a first transformer and a second transformer. Further, the auxiliary circuit includes a pair of silicon-controlled rectifiers (SCRs) including a first SCR and a second SCR. Each of the pair of SCRs is configured to be in an OFF state when alternating current (AC) voltage of the grid is in a normal range and each of the pair of SCRs is configured to be in an ON state when the AC voltage is in a fault range. Furthermore, the auxiliary circuit includes a capacitor electrically connected between the first transformer, the second transformer, and the first SCR. Thereafter, the auxiliary circuit includes a diode biased by the second transformer and the capacitor to enable charging of the capacitor to a peak of the AC voltage during one polarity of the AC voltage when the AC voltage is in the normal range. The capacitor is configured to discharge via the first SCR and the first transformer by injecting the fault current into the grid when the AC voltage is in the fault range. Further, the network includes a triggering circuit to detect a fault in the grid and to turn ON the pair of SCRs. The triggering circuit is electrically connected to the grid and the circuit.

BRIEF DESCRIPTION OF THE DRAWINGS

The following detailed description of illustrative embodiments is better understood when read in conjunction with the appended drawings. For the purpose of illustrating the present disclosure, exemplary constructions are shown in the drawings. However, the present disclosure is not limited to a specific device, or a tool and instrumentalities disclosed herein. Moreover, those in the art will understand that the drawings are not to scale.

DETAILED DESCRIPTION

Figure 1:
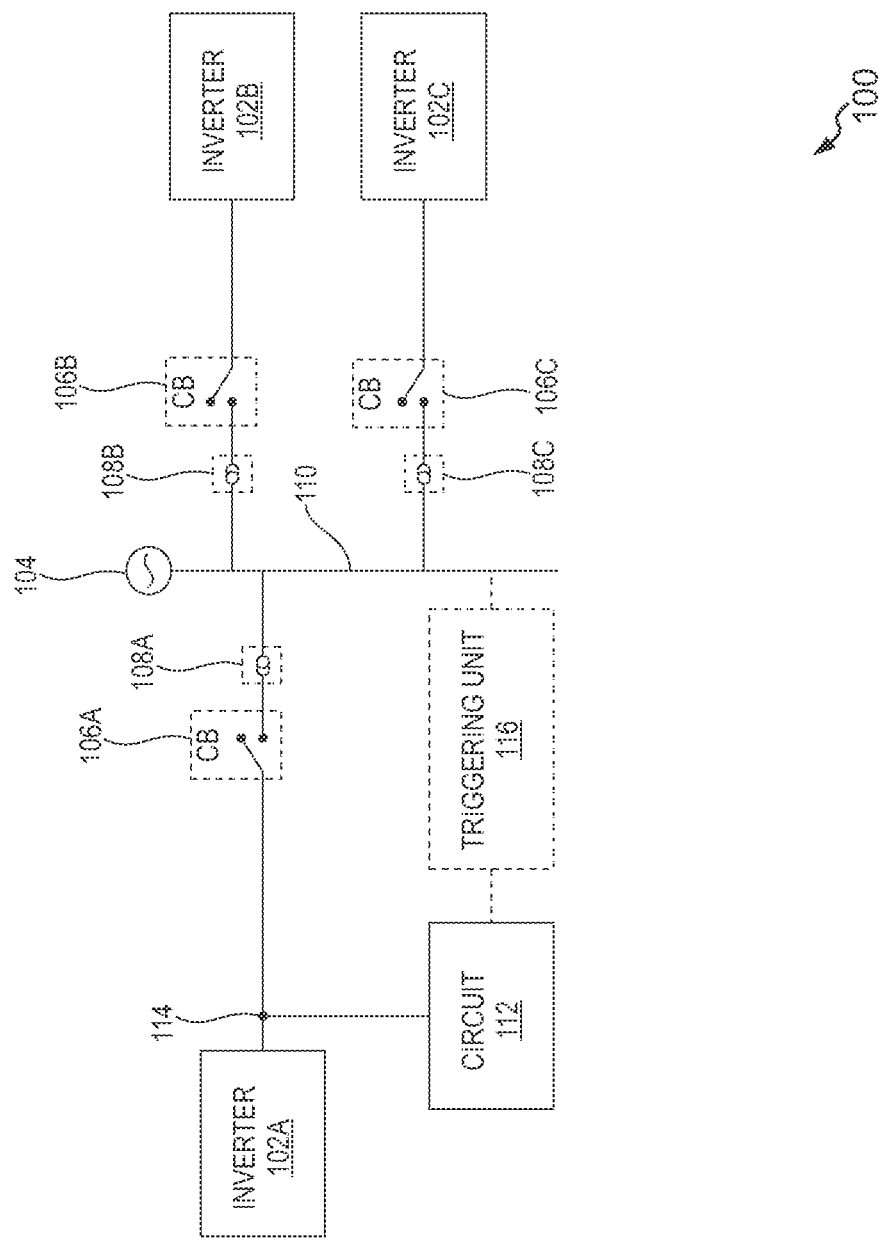
FIG. 1 illustrates an environment related to at least some example embodiments of the present disclosure.

In the following description, for purposes of explanation, numerous specific details are set forth in order to provide a thorough understanding of the present disclosure. It will be apparent, however, to one skilled in the art that the present disclosure can be practiced without these specific details. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Reference in this specification to "one embodiment" or "an embodiment" means that a particular feature, structure, or characteristic described in connection with the embodiment is included in at least one embodiment of the present disclosure. The appearances of the phrase "in an embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure.

The terms "grid", "public grid", "electrical grid", "main grid", "power grid", and "electrical power grid" are generally used interchangeably throughout the description, and they refer to an interconnected network of one or more components for electricity delivery from producers such as power stations to user loads. The components may include energy sources, electric substations, an electrical power transmission system, an electrical power distribution system, and the like. The grid may vary in size and can cover large areas such as one or more cities or states.

The term "microgrid" refers to a local electrical grid with defined boundaries, acting as a single and controllable entity that is usually attached to a main grid but is also able to function independently.

The term "inverter" refers to an electronic device that converts Direct Current (DC) power to Alternating Current (AC) power.

The terms "load", "electric load", and "user load" may be used interchangeably throughout the description, and they refer to any component of a circuit that consumes power or energy.

The terms "grid faults", "faults", "electrical faults", and "microgrid faults" may have been used interchangeably throughout the description, and they refer to an abnormal condition that causes a circuit element in the grid or the microgrid to fail to perform in an expected manner due to disruption in the flow of electric current. It may be noted that faults lead to electrical outages, equipment damage, and safety hazards. The different types of faults may include short circuit faults, ground faults, open circuit conditions, overload conditions, voltage sags or swells, etc.

Overview

Various embodiments of the present disclosure provide an auxiliary circuit for injecting fault current into the grid when a fault is detected in the grid. As may be understood, the grid is an electrical network that interconnects various electrical sources and loads and helps in the transmission of electrical power from sources to loads. The electrical sources can be of different types such as hydropower sources, fuel cell sources, wind power sources, nuclear energy sources, etc. These electrical sources are connected to the grid to energize the grid. The electrical sources that generate direct current (DC) power need an inverter to convert the DC power into alternating current (AC) power before providing the AC power to the grid.

If an electrical source or a load connected to the grid is malfunctioning or faulty, then it might result in a drop in the nominal voltage of the grid. Further, the faulty electrical source or the load needs to be safely isolated from the grid before it gets repaired. This action would generally be performed by a Circuit Breaker (CB). A CB is a device that breaks a connection between two or more electrical components when a certain condition is met. The conditions can be faults such as short circuits, overcurrent, ground faults, etc. A CB associated with a faulty electrical source or load needs to be tripped to disconnect that particular faulty source or load from the grid. The CB trips if the current flowing through the CB exceeds its trip setting/threshold limit. The current through the CB at a fault location depends on the current injected by the other sources close to the location of the fault. Other electrical sources that are current limited may not have enough current capabilities to provide the additional current that is needed to trip the CB associated with the faulty source or load.

A circuit is provided in the present disclosure to provide additional current apart from the current injected by the associated source during grid faulty conditions. The circuit is connected to a node between an electrical source and its CB, to inject current directly into the grid. The circuit includes a capacitor that is charged from the grid when it is healthy. The circuit further includes a step-down transformer that injects fault current into the grid rather than the CB it is connected to. The charged capacitor is connected to the grid through the step-down transformer when the grid voltage drops by at least ten percent of the nominal voltage. The step-down transformer is configured to reduce the currents on the capacitor side while delivering high currents onto the fault side (i.e., towards a faulty source or load or a faulty transmission line in the grid), thereby reducing stress on the capacitor. The circuit further includes an additional transformer and a silicon-controlled rectifier (SCR) to turn off the circuit automatically when the fault in the grid clears. Further, the additional transformer and the SCR make sure that the capacitor does not get charged in reverse polarity which can happen due to resonance between the capacitor and fault impedance which is typically inductive. The circuit also makes sure that the current on the fault side stays at the desired level until the fault is cleared.

Various embodiments of the present disclosure offer multiple advantages. For instance, the present disclosure facilitates a circuit to inject fault current into the grid when the grid is faulty and to safely isolate the circuit when the grid recovers. To that effect, the proposed circuit uses an additional transformer and an AC switch to safely isolate the capacitor under normal operating conditions. Further, the high turn ratio of the transformer (such as the transformer 302) will make sure that the current is much less on the capacitor side while delivering a high current on the fault side thereby reducing the stress on the capacitor. The diode on the primary side prevents charging the capacitor to negative polarity and also enables charging the capacitor from the grid voltage. The selection of the magnetizing inductances of secondary windings of the transformers provides the required capacitor voltage under healthy grid voltage conditions. The circuit also helps in holding the fault current until the fault circuit breaker trips. The circuit injects the fault current directly into the grid rather than just the circuit breaker it is close to, which helps in injecting current into distant faults aiding to trip the fault location breaker/fuse. Further, the circuit acts like an automatic turn-off mechanism for the SCRs in the circuit once the fault is cleared eliminating the need for additional commutation circuits.

Various example embodiments of the present disclosure are described hereinafter with reference to FIGS. 1-5.

FIG. 1 illustrates an environment 100 related to at least some example embodiments of the present disclosure. Although the environment 100 is presented in one arrangement, other embodiments may include the parts of the environment 100 (or other parts) arranged differently depending on, for example, an auxiliary circuit proposed in the present disclosure for injecting a fault current into a grid when a fault is detected in the grid. It may be noted that a fault can occur anywhere in the grid such as at an electrical source, a load, a transmission line, and the like.

The environment 100 illustrated in FIG. 1 includes one or more inverters 102A, 102B, and 102C configured to provide alternating current (AC) power to a grid 104. Each inverter can be connected to a corresponding power source (not shown in FIG. 1). The power sources can be any one of solar, fuel cell sources, DC storage, batteries, etc. In FIG. 1, only three inverters 102A-102C are shown for exemplary purposes, however, there can be any number of inverters connected to the grid 104. The inverters 102A-102C are electrically connected to the grid 104 via circuit breakers (CBs) 106A, 106B, and 106C and power transformers 108A, 108B, and 108C respectively as shown in FIG. 1. Further, in FIG. 1, only three CBs 106A-106C and power transformers 108A-108C are shown for exemplary purposes, each CB and each transformer connected to each inverter, however, there can be any number of CBs and power transformers connected to the grid 104.

The inverters 102A-102C are either voltage source inverters or current source inverters to convert DC power provided by the power sources to AC power. The AC power is thereby provided to the grid 104 via the CBs 106A-106C and the power transformers 108A-108C. In some scenarios, the AC power can be directly provided to loads (not shown in FIG. 1) that require AC power for their operation such as motors, power tools, heating systems, industrial machinery, etc.

In general, all the inverters 102A-102C injecting the AC power into the grid 104 should meet the requirements of grid interconnection standards that may vary for different regions around the world. Under faulty conditions on the grid 104, the voltage of the grid 104 might dip upon which the inverters 102A-102C would isolate themselves from the grid 104. In other words, it may be noted that faults occurring at a distribution level (on low voltage side sources or loads) create a voltage dip on a medium voltage (MV) bus 110 in the grid 104. Faults on the grid 104 shall be cleared by associated CBs 106A-106C depending on the fault current. In general, most of the fault current is supplied by locally connected sources based on their respective impedances to the fault location. Further, the peak current supply capability of the inverters 102A-102C is bounded by their switching semiconductor's thermal characteristics. As a result, limited fault current gets supplied to the fault locations causing higher CB trip time. Therefore, an auxiliary circuit such as an auxiliary circuit 112 (hereinafter, interchangeably referred to as a circuit 112) is required in addition to the inverters 102A-102C to supply adequate fault current into the grid 104 (i.e., towards a faulty source or load or a faulty transmission line in the grid 104) when the fault occurs in the grid 104 as shown in FIG. 1.

Grid 104 may be associated with a microgrid, wherein the microgrid can also function independently of the grid 104. It should be understood that the microgrid can also include several power sources associated with inverters (e.g., the inverters 102A-102C) that supply AC power to several loads. Circuit 112 may be used to supply adequate fault current, not only to the grid 104 but also to microgrids, when fault occurs in the grid 104 and/or the microgrids. Therefore, it may be noted that the invention proposed in the present disclosure is also applicable to microgrid faults without limiting the scope of the invention. Also, it may be noted that the environment 100 represents a single-phase implementation of various components of the environment 100.

The circuit 112 is configured to inject the fault current into the grid 104 when the grid 104 is faulty. In accordance with a non-limiting embodiment, the environment 100 illustrates the interconnection of the circuit 112 to a node 114 that connects the inverter 102A to the CB 106A. However, in some embodiments, each inverter may have an associated circuit (such as the circuit 112) (not shown in FIG. 1) to inject the fault current into the grid 104. In some other embodiments, it may be noted that the circuit 112 can be used in conjunction with any type of electrical source, not necessarily to be associated with an inverter, thereby not limiting the scope of the invention. Further, the circuit 112 is an interconnection of electrical elements to inject additional currents into the grid 104 when there is a fault in the grid 104, which will be explained later in the description of the present disclosure.

The power transformers 108A-108C are passive electromagnetic devices that transfer power from one circuit to another circuit by means of inductive coupling. In one example embodiment, the power transformers 108A-108C step up the AC voltages from the inverters 102A-102C to levels required for connecting to the grid 104.

Further, the environment 100 also shows a triggering unit 116 (otherwise also referred to as a triggering circuit/means) electrically connected to the grid 104 and the circuit 112. In an embodiment, the triggering unit 116 corresponds to a computing device configured to detect a fault in the grid 104 based on a comparison of the AC voltage of the grid 104 with a predefined fault range, where the predefined fault range is provided by the grid interconnection standards. To that effect, the triggering unit 116 is configured to detect the fault in the grid 104 when the AC voltage of the grid 104 falls within the predefined fault range. To detect the faults in the grid 104, the triggering unit 116 is configured to monitor the grid 104. The triggering unit 116 is configured to activate the circuit 112 to inject the fault current into the grid 104 upon detection of the fault in the grid 104.

Figure 2A:
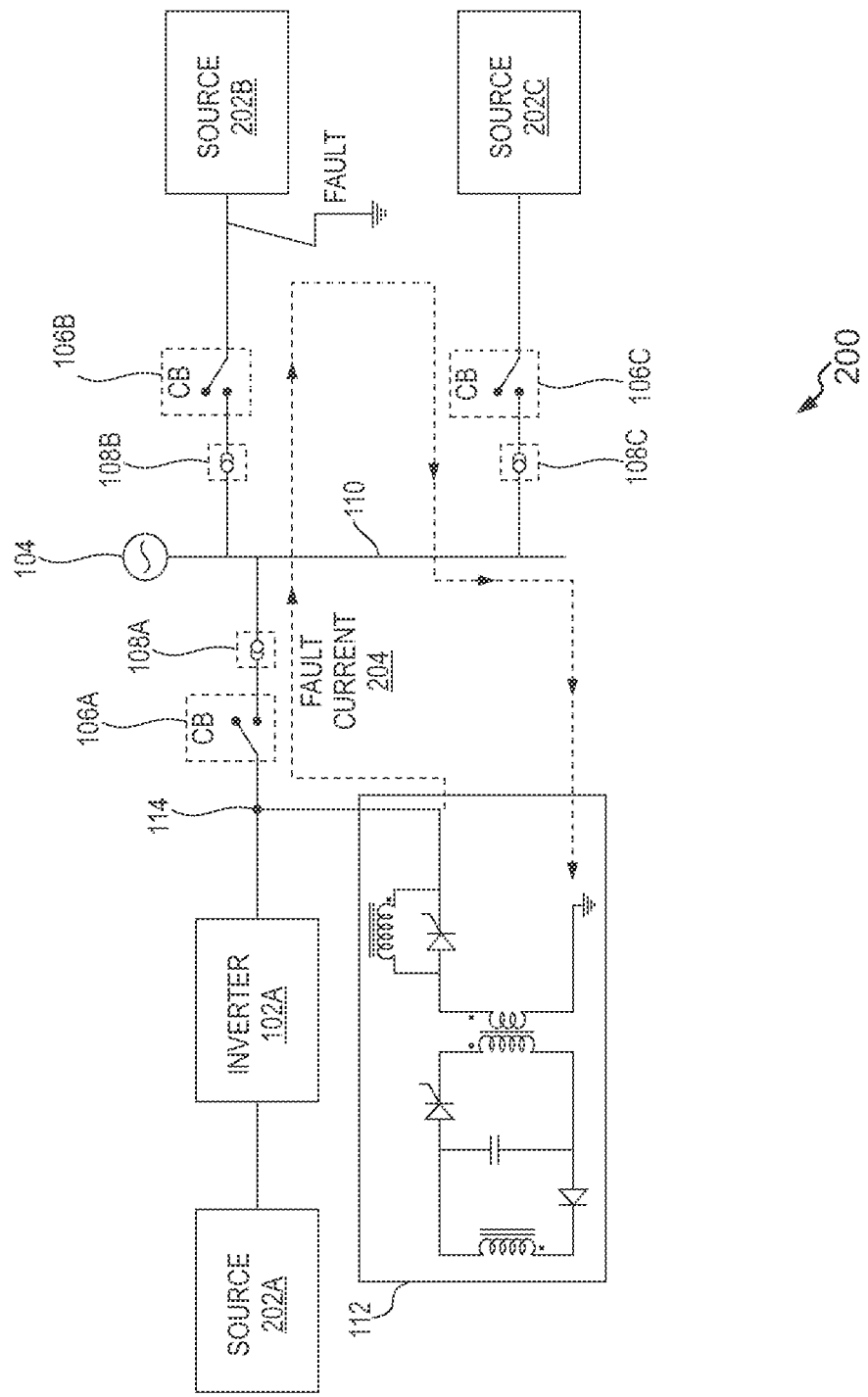
FIG. 2A illustrates the behavior of an auxiliary circuit under fault conditions and its interconnection to an environment related to at least some embodiments of the present disclosure.

In a non-limiting example, the triggering unit 116 includes a microcontroller or Digital Signal Processor-based triggering circuitry that is capable of generating a required amount of voltage to be supplied to activate the circuit 112. For example, the various operations, blocks, etc., such as the triggering circuitry 116 unit described herein may be operated using hardware circuitry (for example, Complementary Metal Oxide Semiconductor (CMOS) based logic circuitry), firmware, software and/or any combination of hardware, firmware, and/or software (for example, embodied in a machine-readable medium). For example, the triggering unit 116 may be embodied using transistors, logic gates, and electrical circuits (for example, Application-Specific Integrated Circuit (ASIC) circuitry and/or Digital Signal Processor (DSP) circuitry). FIG. 2A illustrates the behavior of an auxiliary circuit (e.g., the circuit 112) under fault conditions and its interconnection to an environment 200 related to at least some embodiments of the present disclosure. The environment 200 is similar to the environment 100 in that a source 202A is connected to the inverter 102A, and the inverters 102B and 102C are replaced by their sources 202B and 202C. As explained with reference to FIG. 1, the sources 202A-202C are power sources such as solar, fuel cell sources, batteries, etc. Moreover, in an embodiment, the sources 202B and 202C may also be connected to their corresponding inverters (not shown in FIG. 2A) for supplying AC power to the grid 104.

The environment 200 depicts internal components of the circuit 112, the functioning of which is explained later with reference to FIGS. 3A-3E. The circuit 112 is connected to the node 114 connecting the inverter 102A with the CB 106A, because connecting the circuit 112 across the CB 106A and triggering the circuit 112 will otherwise pump a high current into the CB 106A, which would result in isolating the inverter 102A from the fault (i.e., a faulty source or load or a faulty transmission line in the grid 104) instead of supplying the fault current to aid in tripping the fault location CB (such as the CB 106B).

In FIG. 2A, the source 202B is indicated to be faulty. It should be noted that any other source connected to the grid 104 can be faulty. Since the circuit 112 is connected across a line instead of the CB 106A, the circuit 112 will inject an additional fault current that helps in tripping the fault location CB 106B. The capacitor and the transformers of the circuit 112 are designed as per the interconnection requirements of the grid 104. The environment 200 depicts a direction (see, 204) of the fault current originating from the circuit 112 and flowing through the CB 106B. An interconnection between the circuit 112 and the grid 104 including the source 202B that is faulty is explained next with reference to FIGS. 3A to 3E.

Figure 2B:
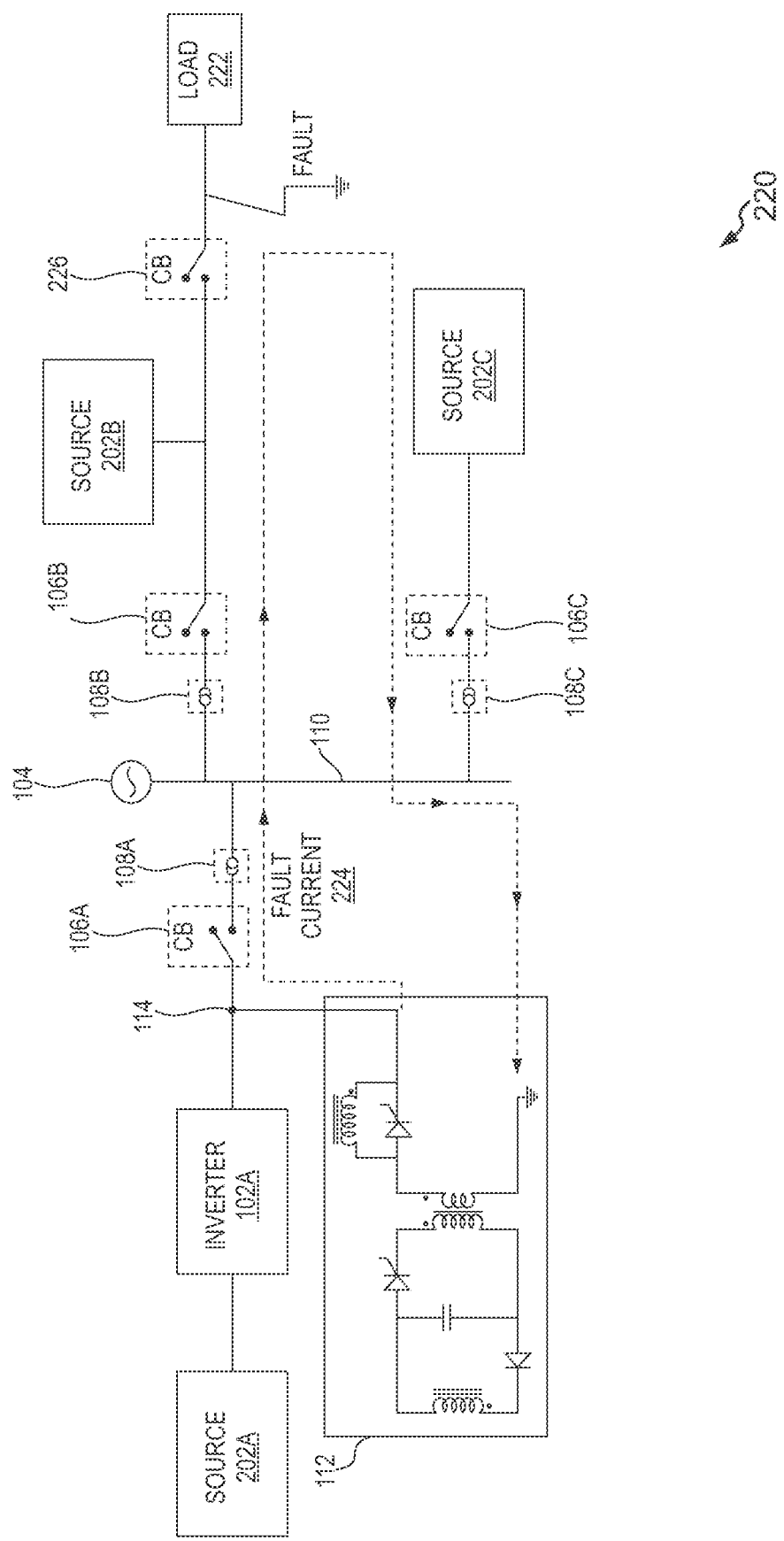
FIG. 2B illustrates the behavior of the auxiliary circuit under fault conditions and its interconnection to another environment related to at least some embodiments of the present disclosure.

FIG. 2B illustrates the behavior of the auxiliary circuit 112 under fault conditions and its interconnection to another environment 220 related to at least some embodiments of the present disclosure. The environment 220 is similar to the environment 200 in that a load 222 is shown to be connected to the source 202B. In a non-limiting example, the load 222 may be a DC load, an AC load, a critical load, etc. If the load 222 is a DC load including loads such as mobile phones, laptops, battery charging systems, etc., the source 202B may directly supply DC power to the load 222. However, if the load comprises AC loads such as motors, heating systems, power tools, industrial equipment, etc., the source 202B may supply AC power to the load 222 via its corresponding inverter (not shown in FIG. 2B). Further, in an embodiment, the critical load may be either a DC load or an AC load, and hence the source 202B may supply power directly or in conjunction with the inverters.

In FIG. 2B, the load 222 is indicated to be experiencing some fault Further, the environment 220 depicts a direction (see, 224) of the fault current originating from the circuit 112 and flowing through the CB 106B and CB 226 that is associated with the faulty load such as the load 222. Herein, in an embodiment, it may be noted that the explanation of the interconnection between the circuit 112 and the grid 104 including the load 222 that is faulty and may be similar to that of the environment 200 where the source 202B is faulty which is explained next with reference to FIGS. 3A-3E.

Figure 2C:
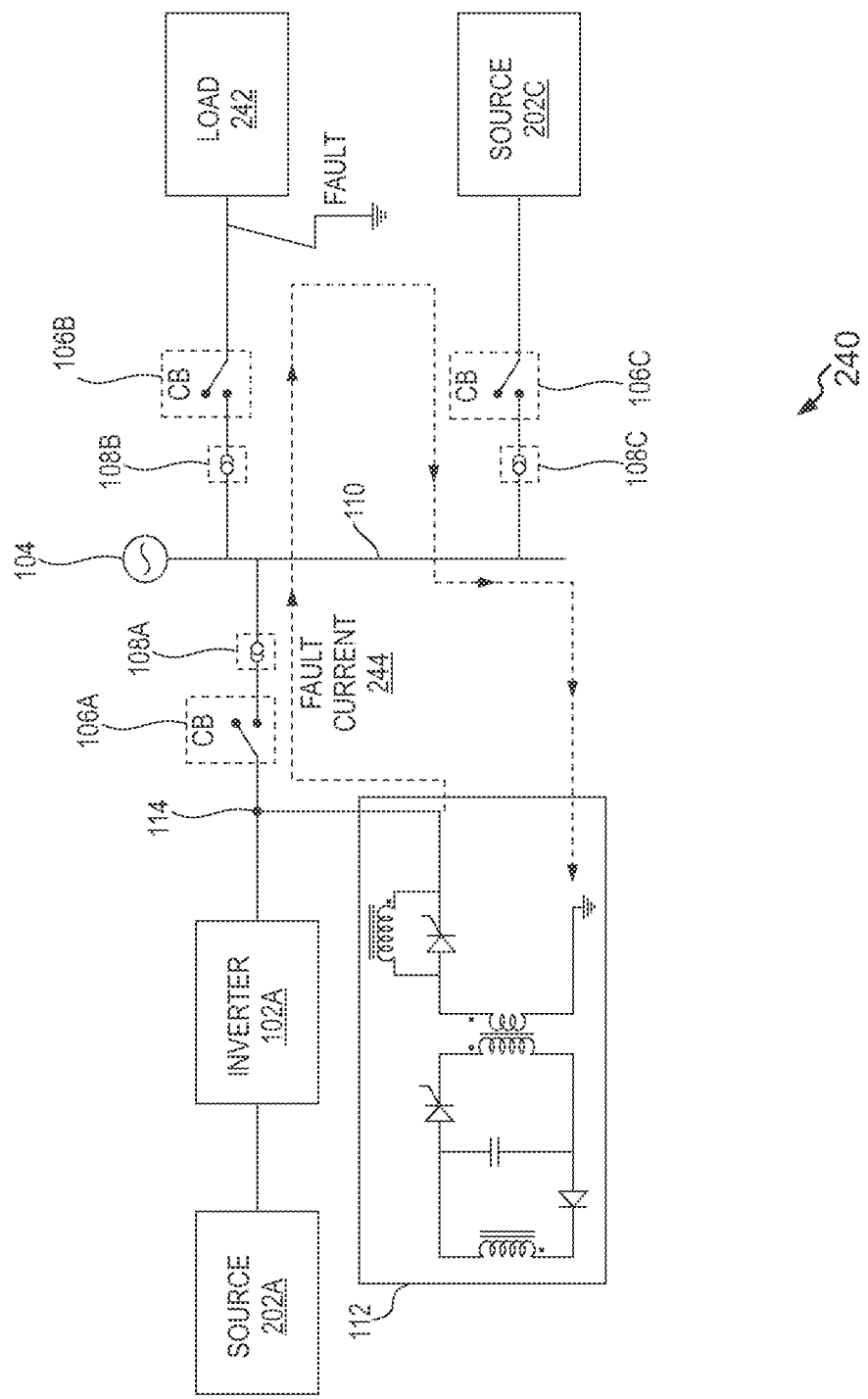
FIG. 2C illustrates the behavior of the auxiliary circuit under fault conditions and its interconnection to yet another environment related to at least some embodiments of the present disclosure.

FIG. 2C illustrates the behavior of the auxiliary circuit 112 under fault conditions and its interconnection to yet another environment 240 related to at least some embodiments of the present disclosure. Herein, the environment 240 is similar to the environment 220 in that the source 202B is replaced with a load 242. In a non-limiting example, the load 242 is an AC load or an AC critical load as it is directly connected to the MV bus 110 of the grid 104.

In FIG. 2C, the load 242 is indicated to be experiencing some fault. Further, the environment 240 depicts a direction (see, 244) of the fault current originating from the circuit 112 and flowing through the CB 106B that is associated with the faulty load such as the load 242. Herein, in an embodiment, it may be noted that the explanation of the interconnection between the circuit 112 and the grid 104 including the load 242 that is faulty may be similar to that of the environment 200 where the source 202B is faulty which is explained next with reference to FIGS. 3A-3E. Further, it may be noted that, in the case of a three-phase implementation, the same circuit 112 can be employed in each of the three phases or lines of a three-phase source or a three-phase network.

Figure 3A:
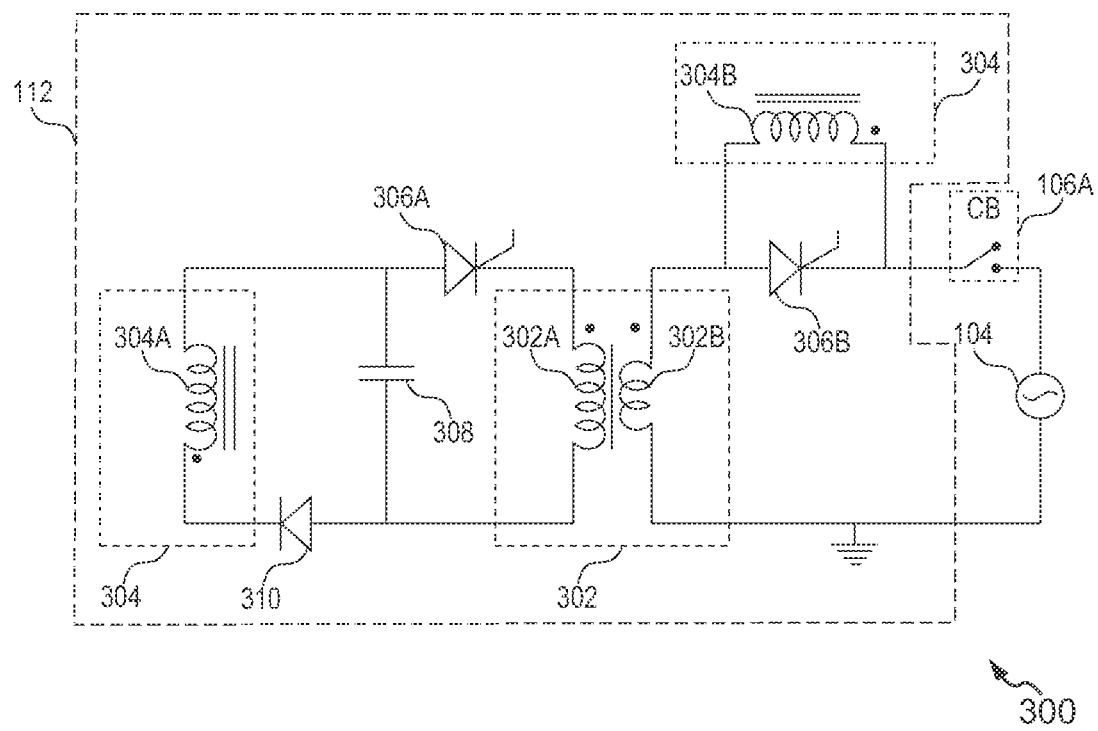
FIG. 3A illustrates an equivalent single-phase circuit diagram for the interconnection of the auxiliary circuit with a grid via a circuit breaker (CB), in accordance with an embodiment of the present disclosure.

FIG. 3A illustrates an equivalent single-phase circuit diagram 300 for the interconnection of the auxiliary circuit (e.g., the circuit 112) with the grid 104 via the circuit breaker (CB) 106A, in accordance with an embodiment of the present disclosure. The circuit 112 is configured to inject the fault current into the grid 104 when the grid 104 is faulty.

In one embodiment, the circuit 112 includes a set of transformers such as a pair of transformers including a first transformer 302 (hereinafter, interchangeably referred to as a transformer 302) and a second transformer 304 (hereinafter interchangeably referred to as a transformer 304), a set of silicon-controlled rectifiers (SCRs) such as a pair of SCRs including a first SCR 306A (hereinafter, interchangeably referred to as a SCR 306A) and a second SCR 306B (hereinafter, interchangeably referred to as a SCR 306B), a capacitor 308, and a diode 310.

The transformer 302 includes a primary winding 302A and a secondary winding 302B, where the primary winding 302A has more turns than the secondary winding 302B. In one example embodiment, the transformer 302 is a step-down transformer configured to reduce the current on the capacitor 308 by a desired factor. Herein, in an embodiment, the desired factor corresponds to the turns ratio of the transformer 302. The transformer 304 includes a primary winding 304A and a secondary winding 304B, where both the primary winding 304A and the secondary winding 304B have equal turns resulting in a transformer turns ratio of 1.

SCR 306A and 306B are semiconductor devices that can be triggered by providing a positive current to their respective gate electrodes. In one example, the positive current is provided by an external triggering circuit (such as the triggering unit 116 shown in FIG. 1), when the triggering unit 116 detects a fault in the grid 104. SCRs 306A and 306B have two states, an ON state, and an OFF state, based on bias provided to the SCRs 306A and 306B. The SCRs 306A and 306B are configured to be in the OFF state when AC phase voltage of the grid 104 is in a normal range. Further, the SCRs 306A and 306B are configured to be in the ON state when the AC phase voltage is in a fault range. The capacitor 308 is a device configured to store charge and the diode 310 is a semiconductor device that conducts electric current in one direction. The diode 310 acts as a half-wave rectifier and charges the capacitor 308 to the peak of the AC phase voltage when the AC phase voltage is in the normal range. Further, the capacitor 308 is configured to discharge via the SCR 306A and the transformer 302 by injecting the fault current into the grid 104 when the AC phase voltage is in the fault range.

As shown in FIG. 3A, the capacitor 308 is electrically connected between the transformer 302, the transformer 304, the SCR 306A, and the diode 310. To that effect, the capacitor 308 is electrically connected in parallel to a series connection of the SCR 306A and the primary winding 302A. Further, the capacitor 308 is electrically connected in parallel to a series connection of the primary winding 304A and the diode 310. The secondary winding 304B is electrically connected in parallel to or across the SCR 306B. The secondary winding 302B is connected in series with the SCR 306B, the circuit breaker (CB) 106A, and the grid 104.

Figure 3B:
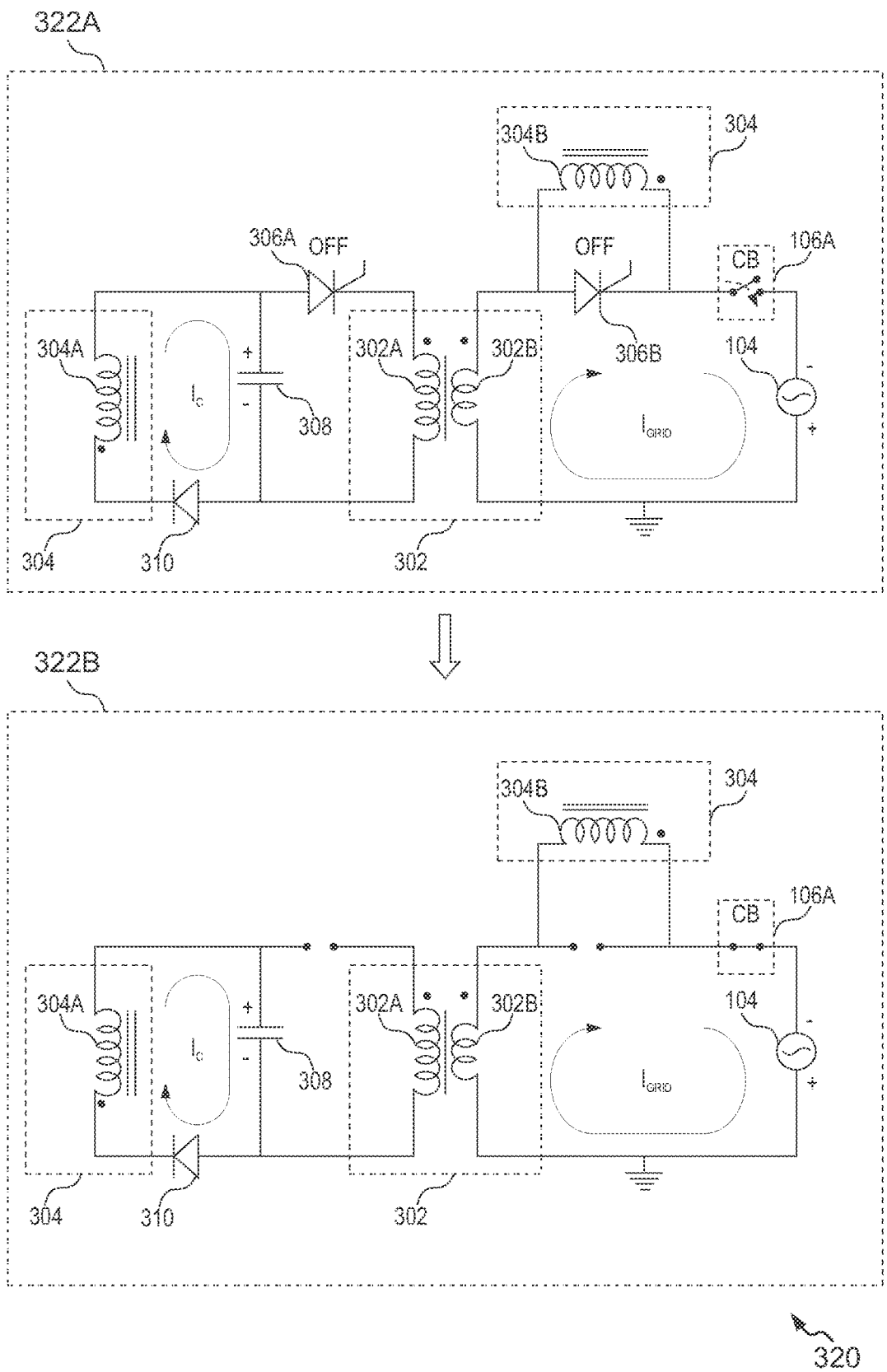
FIG. 3B illustrates an operation of the auxiliary circuit while charging a capacitor from the grid when the grid is healthy, in accordance with an embodiment of the present disclosure.

FIG. 3B illustrates an operation 320 of the auxiliary circuit (e.g., the circuit 112) while charging a capacitor (e.g., the capacitor 308) from the grid 104 when the grid 104 is healthy, in accordance with an embodiment of the present disclosure. FIG. 3B shows an equivalent single-phase circuit diagram 322A corresponding to the circuit 112 showing operating states of one or more components of the circuit 112. FIG. 3B also shows another equivalent single-phase circuit diagram 322B corresponding to the circuit 112 showing equivalent representations of the operating states of the corresponding one or more components. Furthermore, FIG. 3B shows current flow through grid 104 and the capacitor 308 with appropriate directions during the charging process of the capacitor 308 when the grid 104 is healthy and functioning normally.

In one embodiment, the CB 106A is closed to connect the circuit 112 with the grid 104. The CB 106A is associated with the inverter 102A (shown in FIG. 1). The CB 106A is closed to connect the inverter 102A with the grid 104 at all times to inject the fault current into the grid 104. In general, low voltage side inverters such as the inverter 102A have limited capabilities to inject the fault current because of their current generation limitations. Therefore, the circuit 112 is connected to the node 114 which connects the inverter 102A to the CB 106A to inject additional fault currents into grid 104 when the grid 104 is faulty. To inject the fault current when needed, the capacitor 308 has to be charged when the grid 104 is healthy.

In FIG. 3B, the SCRs 306A and 306B are turned OFF when the grid 104 is healthy, and the capacitor 308 is charged to a desired peak of an AC phase voltage of the grid 104. The term 'healthy' indicates that the AC phase voltage of the grid 104 is in the range of a pre-defined nominal voltage of the grid 104. The SCRs 306A and 306B are considered as open connections (as shown in the another equivalent single-phase circuit diagram 322B of the circuit 112 in FIG. 3B) since the SCRs 306A and 306B are turned OFF. The capacitor 308 is charged by the current through the primary winding 304A and the diode 310. In particular, the current $I_{grid}$ from the grid 104 flows through the secondary winding 302B and the secondary winding 304B, during a negative half cycle of the AC phase voltage of the grid 104. The transformer 304 through its secondary winding 304B provides the current $I_c$ for the charging of the capacitor 308. The diode 310 does not allow the capacitor 308 to charge in a positive half cycle of the AC phase voltage of the grid 104 because the diode 310 is reverse biased and the SCRs 306A and 306B are turned OFF disconnecting the capacitor 308 from the grid 104. The diode 310 and the primary winding 304A of the transformer 304 act as a half-wave rectifier that charges the capacitor 308 to the peak of the AC phase voltage of the grid 104 during the negative half cycle.

Further, in order to charge the capacitor 308 to the peak of the AC phase voltage, the voltage drop across the secondary winding 302B has to be kept low. To keep the voltage drop across the secondary winding 302B low, the first and second transformers 302 and 304 are designed in such a way that a magnetizing inductance ($L_{m2}$) of the secondary winding 304B will be much higher than a magnetizing inductance ($L_{m1}$) of the secondary winding 302B. As a result, a shunt impedance ($X_{m2}$) across the secondary winding 304B gets much higher than a shunt impedance ($X_{m1}$) of the secondary winding 302B i.e., $X_{m2} \gg X_{m1}$. Therefore, upon applying Kirchhoff's voltage law (KVL) across the secondary windings 302B and 304B, the voltage drop across the secondary winding 302B will be much less preventing the transformer 302 from saturation when the $L_{m2} \gg L_{m1}$.

To that end, it may be noted that such a condition also helps in reducing the reverse blocking voltage of SCR 306A. By keeping the voltage drop across the secondary winding 302B low, the entire AC phase voltage of the grid 104 appears across the secondary winding 304B allowing the capacitor 308 to charge to the peak of the AC phase voltage of the grid 104. The changes in the circuit 112 upon an occurrence of a fault in the grid 104, will be explained next with reference to FIG. 3C.

Figure 3C:
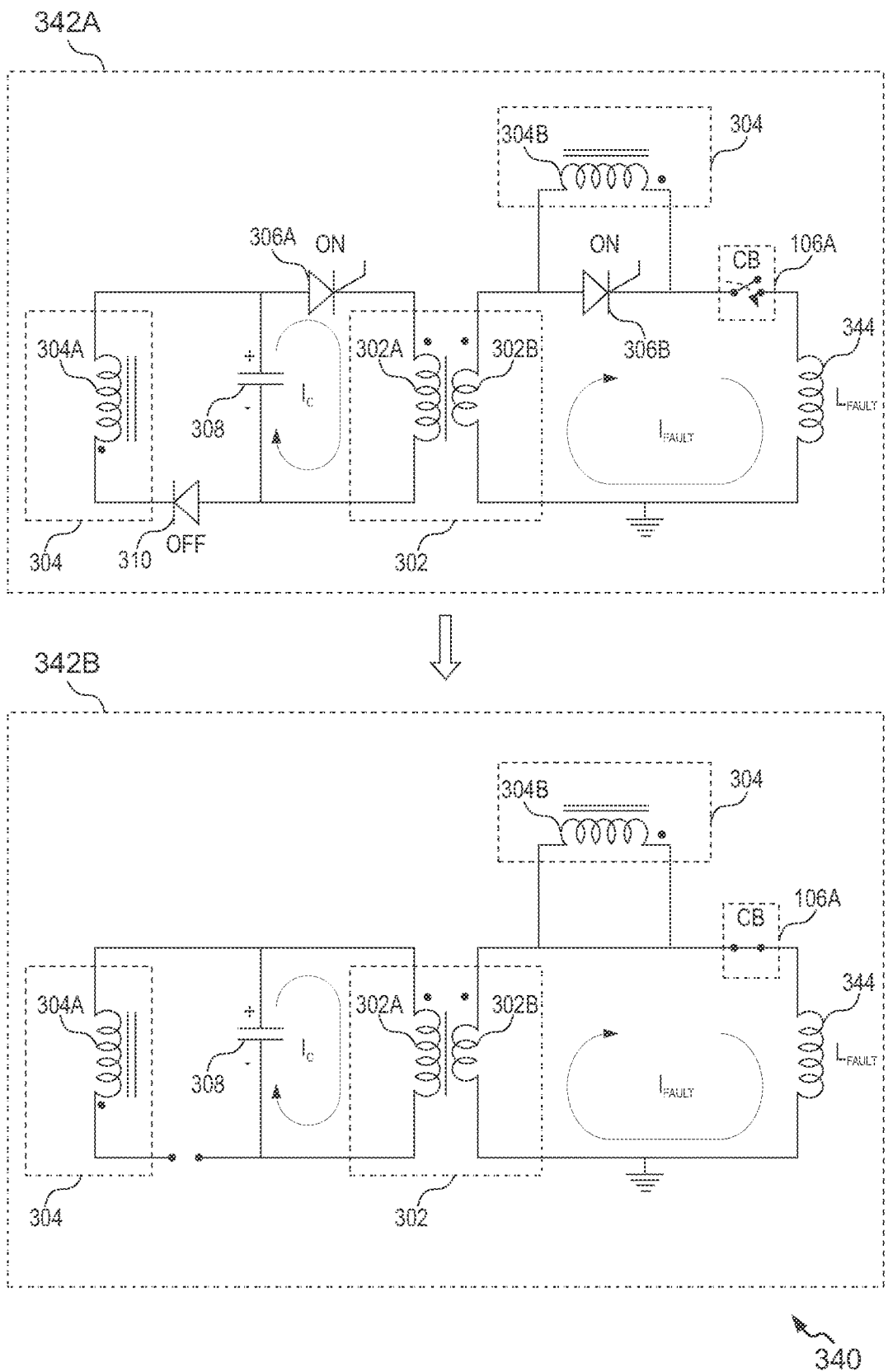
FIG. 3C illustrates the operation of the auxiliary circuit upon the occurrence of a fault in the grid, in accordance with an embodiment in the present disclosure.

FIG. 3C illustrates the operation 340 of the circuit 112 upon the occurrence of a fault in the grid 104, in accordance with an embodiment in the present disclosure. FIG. 3C also shows an equivalent single-phase circuit diagram 342A corresponding to the circuit 112 showing operating states of one or more components of the circuit 112. FIG. 3C also shows another equivalent single-phase circuit diagram 342B corresponding to the circuit 112 showing equivalent representations of the operating states of the corresponding one or more components. Furthermore, FIG. 3C shows current flow through grid 104 and the capacitor 308 with appropriate directions upon the occurrence of the fault.

Further, it may be understood that in an embodiment, the faults on the grid 104 such as L-G/L-L/L-L-L/L-L-L-G faults might result in a drop in the AC phase voltage of the grid 104 that will be detected by an external means (such as the triggering unit 116) to trigger the circuit 112.

In one embodiment, a triggering circuit (such as the triggering unit 116 shown in FIG. 1) detects that there is a drop in the AC phase voltage of the grid 104. In particular, the triggering unit 116 monitors the AC phase voltage of the grid 104 and then triggers the circuit 112 when the AC phase voltage of the grid 104 drops below a threshold trigger value. In one embodiment, the triggering unit 116 detects that the drop in the AC phase voltage of the grid 104 exceeds at least ten percent of the nominal voltage of the grid 104. The nominal voltage of the grid 104 is a predefined value set by the grid interconnection standard where all the energy sources connected to the grid 104 are expected to be fully functional.

In one embodiment, the triggering unit 116 will identify that a fault has occurred in the grid 104 and trigger the circuit 112 upon detecting the drop in the voltage of the grid 104. In particular, the triggering unit 116 triggers the circuit 112 by turning ON the SCRs 306A and 306B. The SCRs 306A and 306B can be turned ON by providing a positive current to their respective gate terminals. By switching ON the SCRs 306A, 306B, the capacitor 308 gets connected to the fault through the first transformer 302 which is shown in FIG. 3C. Further, in FIG. 3C, the SCRs 306A and 306B are assumed to be short circuits when the SCRs 306A and 306B are turned ON (as shown the another equivalent single-phase circuit diagram 342B of the circuit 112 in FIG. 3C). Also, the second transformer 304 gets short-circuited when the second SCR 306B is turned ON as shown in the single-phase circuit diagram 342B of the circuit 112 in FIG. 3C. Further, the diode 310 turns OFF due to negative bias from the capacitor 308. In FIG. 3C, the diode 310 is assumed to be an open circuit as the diode 310 is negatively biased as shown in the single-phase circuit diagram 342B of the circuit 112.

In general, most of the grid faults are inductive in nature and the fault in the grid 104 because of a source (such as the source 202B shown in FIG. 2A), a load (such as the load 222 or the load 242 shown in FIGS. 2B and 2C) is represented by an inductor with an inductance $L_{fault}$. However, it may be noted that the grid faults also have resistance (R). Further, it is understood that the fault resistance might decay the fault current based on the time constant of the fault impedance. However, as the typical R/X ratios of a high-power grid roughly vary between 0.1-0.2, the effect of the same could be negligible considering the fault clearing times of CBs which are in a few line cycles.

In FIG. 3C, the fault in the grid 104 is represented by a fault inductor 344 that results in resonance between the capacitor 308 and the fault inductor 344. The capacitor 308 discharges through the first winding 302A with a current $I_c$. The current $I_c$ is stepped up into high fault current $I_{fault}$ by the high turns ratio of the transformer 302. Since the transformer 302 has less number of turns in the secondary winding 302B, high current $I_{fault}$ is injected into the grid 104 that aids in tripping the CB associated with the faulty source (i.e., a circuit breaker 106B of the source 202B shown in FIG. 2A) or a faulty load (i.e., the CB 106B of the load 222 or the load 242 shown in FIGS. 2B and 2C respectively). In a non-limiting example, the turns ratio of the transformer 302 could be N:1, meaning the primary winding 302A of the transformer 302 having N turns, while the secondary winding 302B of the transformer 302 has only 1 turn.

In one embodiment, the capacitor 308 resonates with the fault inductor 344 during the presence of the fault in the grid 104. The time period for the resonance can be calculated by the expression:

$$T=2*\pi*\sqrt{(C*L_{fault})} \tag{1}$$

where T is the time period for the resonance, C is the equivalent capacitance of the capacitor 308 reflected on the secondary side of the transformer 302, and $L_{fault}$ is the inductance of the fault inductor 344.

If the time period T for the resonance is greater than the instantaneous trip time setting $T_{CB\_inst}$ of the CB 106B associated with the source 202B, then the CB 106B will trip and clear the fault (i.e., disconnect source 202B from the grid 104). In one example embodiment, the time period T should be greater than at least four times the instantaneous trip time setting $T_{CB\_inst}$ of a CB (i.e., the circuit breaker 106B) to trip the CB before the resonance enters the second quarter cycle. From the expression (1), it can be observed that the time period T of the resonance depends on the inductance $L_{fault}$. The time period T of the resonance changes proportionally with the fault inductance $L_{fault}$. In particular, the time period T of the resonance reduces as the inductance $L_{fault}$ reduces leading to discharge of the capacitor 308 to zero volts before the associated circuit breaker CB 106B trips. During the discharge of the capacitor 308 and after reaching zero volts, the circuit 112 may enter the second quarter cycle of the resonance where the capacitor 308 will get charged to a negative voltage. The relationship between voltage $V_{dc}$ of the capacitor 308 and the fault current $I_{fault}$ at the end of a second-quarter cycle of the resonance is depicted in FIG. 4.

Figure 4:
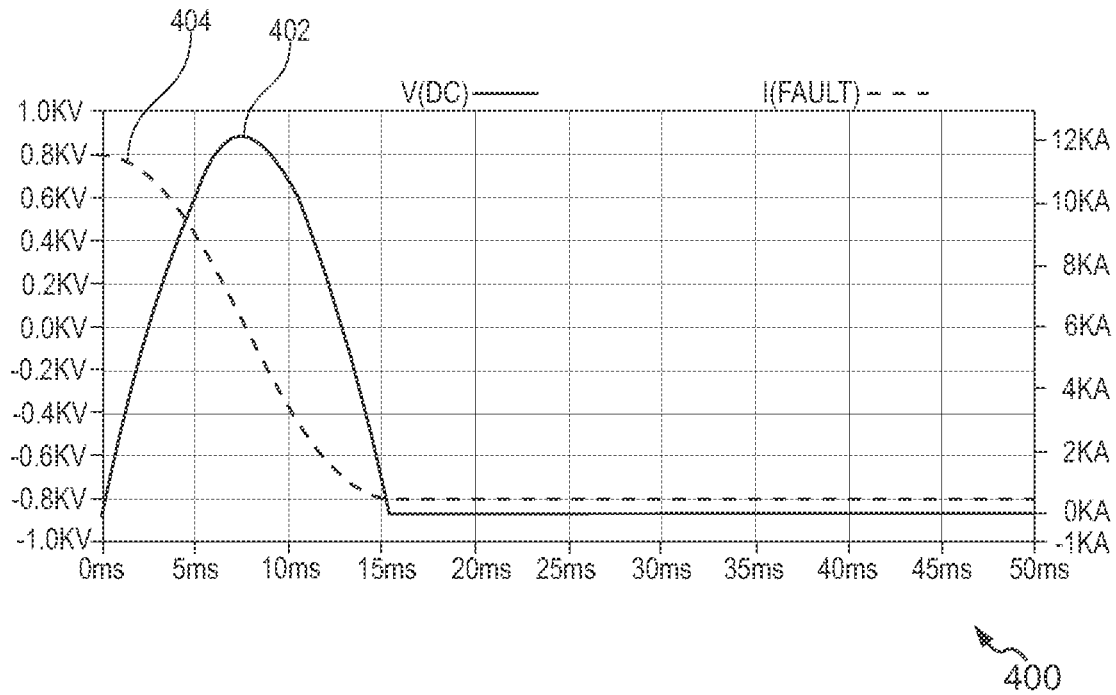
FIG. 4 is a graph showing a relationship between a voltage $V_{dc}$ of the capacitor and a fault current $I_{fault}$, in accordance with an embodiment of the present disclosure.

FIG. 4 is a graph 400 showing the relationship between the voltage $V_{dc}$ of the capacitor 308 and the fault current $I_{fault}$ at the end of the second quarter cycle of the resonance, in accordance with an embodiment of the present disclosure. Further, the variation in the voltage $V_{dc}$ with time is shown in FIG. 4 by a curve 402. Similarly, the variation in the fault current $I_{fault}$ with time and its relation with the voltage $V_{dc}$ is shown in FIG. 4 by a curve 404. From the curve 402 and the curve 404 in the graph 400, it can be derived that the voltage $V_{dc}$ of the capacitor 308 is discharged to zero when the fault current $I_{fault}$ peaked at the end of a first quarter cycle. Further, the graph 400 depicts that the voltage $V_{dc}$ of the capacitor 308 will reach a negative maximum when the fault current $I_{fault}$ drops to zero during a second-quarter cycle of the resonance.

In general, capacitors used in circuits are typically electrolytic which are unipolar because of their high energy density and low current handling capability. Referring to FIG. 3C, continuing operation of the circuit 112 after the voltage $V_{dc}$ of the capacitor 308 reaches zero without turning OFF the SCRs 306A and 306B will lead to damage of the capacitor 308. In order to prevent the capacitor 308 from charging to the negative voltage, the circuit 112 is designed to include the diode 310, the SCR 306B, and the second transformer 304. The change in the configuration of the circuit 112 when the capacitor 308 charges to the negative voltage will be explained next in reference to FIG. 3D.

Figure 3D:
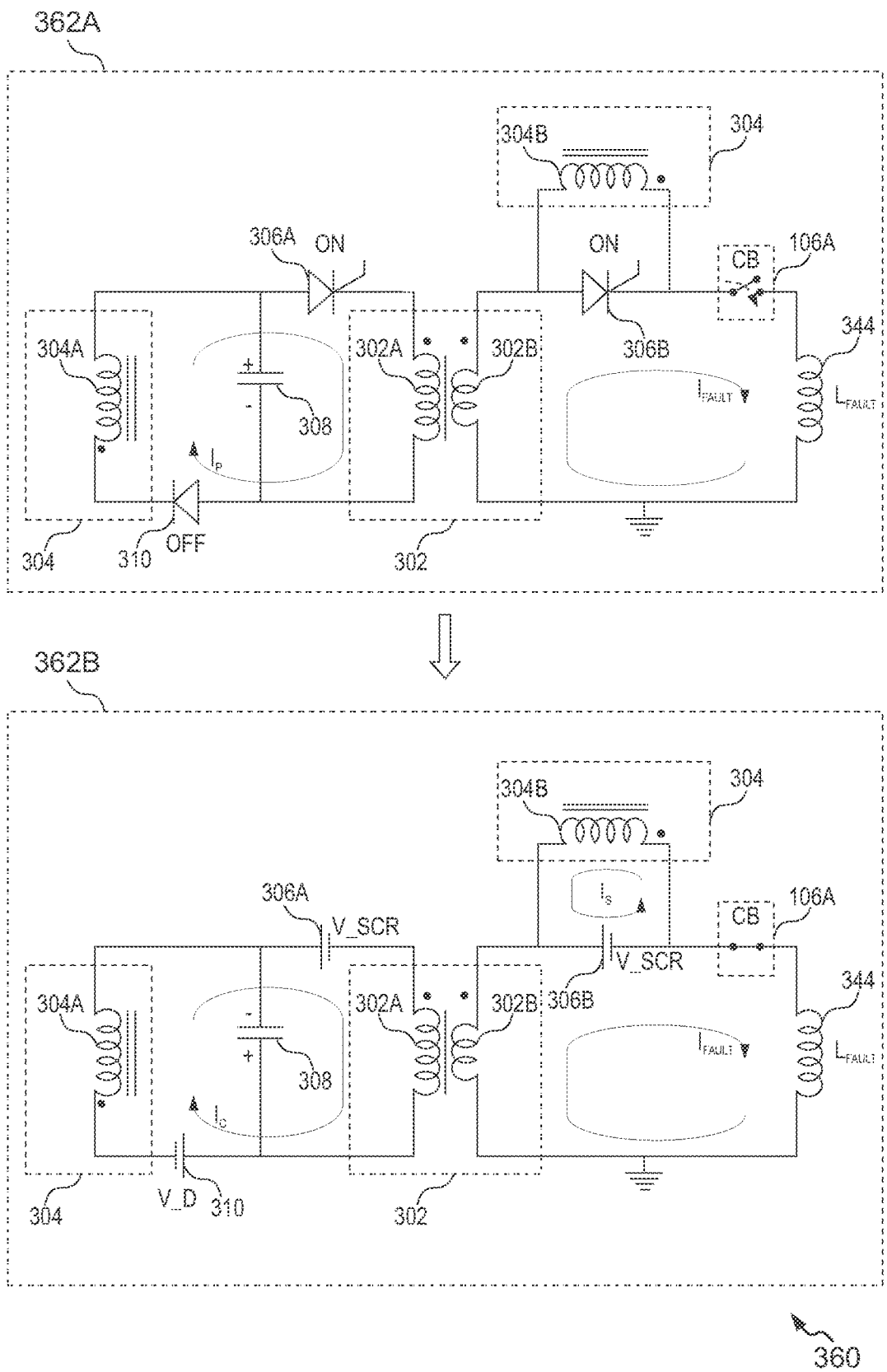
FIG. 3D illustrates the operation of the auxiliary circuit to protect the capacitor from getting charged to a negative voltage during the fault condition, in accordance with an embodiment of the present disclosure.

FIG. 3D illustrates an operation 360 of the circuit 112 with the grid 104 to protect the capacitor 308 from getting charged to a negative voltage during the fault condition, in accordance with an embodiment of the present disclosure. FIG. 3D also shows an equivalent single-phase circuit diagram 362A corresponding to the circuit 112 showing operating states of one or more components of the circuit 112. Further, FIG. 3D shows another equivalent single-phase circuit diagram 362B corresponding to the circuit 112 showing equivalent representations of the operating states of the corresponding one or more components. Furthermore, FIG. 3D shows current flow through grid 104 and the capacitor 308 with appropriate directions to protect the capacitor 308 from getting charged to a negative voltage during the fault condition.

It may be understood that when the capacitor 308 starts getting charged to the negative voltage, the diode 310 gets forward biased connecting the primary winding 304A to the capacitor 308. Since the secondary winding 304B is shorted (shown in FIG. 3C) by the SCR 306B, the short circuit does not allow the capacitor 308 to go negative beyond the turn ON voltage drop across the SCR 306B. Earlier in the present disclosure, the turn ON voltage of the SCRs 306A and 306B was referred to as a short circuit for the sake of simplicity and ease of representation since the turn ON voltage of the SCRs 306A and 306B is much less compared to the AC phase voltage of the grid 104 and the capacitor 308. However, the turn-on voltages of the SCRs 306A and 306B are considered in FIG. 3D. Further, the SCRs 306A and 306B are represented by their turn-ON voltages $V_{SCR}$ in FIG. 3D.

The transformers 302 and 304 are connected in phase opposition (i.e., dot polarities are in phase opposition) in the circuit 112. Due to this connection between the transformers 302 and 304, the voltage drop across the inductor 344 is near zero and the only voltage drop in the circuit 112 is across the windings of the transformers 302, 304, and the SCRs 306A and 306B. As the voltage drop across the inductor 344 is much less, the current $I_{fault}$ would freewheel through the circuit 112 taking a much higher time to decay as compared to the time period T or the instantaneous trip time setting $T_{CB\_int}$, which is shown in FIG. 5.

Figure 5:
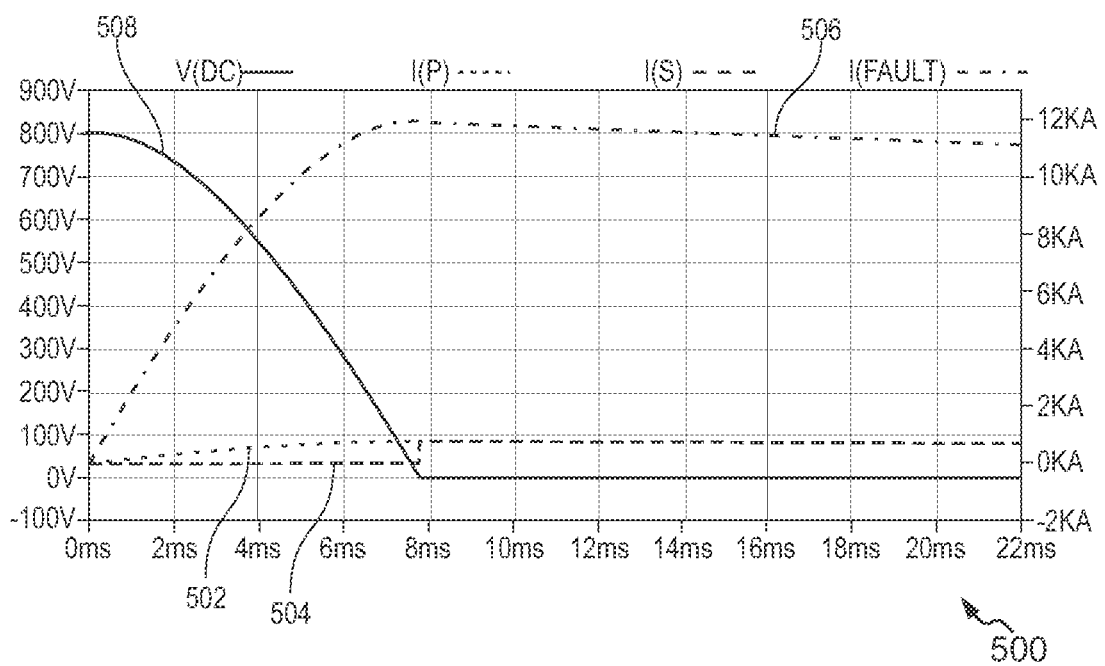
FIG. 5 is a graph showing a relation between currents $I_p$, $I_s$, and $I_{fault}$ in the auxiliary circuit and the voltage $V_{dc}$ across the capacitor, in accordance with an embodiment of the present disclosure.

FIG. 5 is a graph 500 showing the relation between currents $I_p$, $I_s$, and $I_{fault}$ in the circuit 112 and the voltage $V_{dc}$ across the capacitor 308, in accordance with an embodiment of the present disclosure. The variation in the currents $I_p$, $I_s$, and $I_{fault}$ and in the voltage $V_{dc}$ with time and their relative variation with respect to each other is represented in FIG. 5 with curves 502, 504, 506, and 508, respectively. From the curves 502, 504, 506, and 508 in FIG. 5, it can be derived that the fault current $I_{fault}$ reaches the peak when the voltage $V_{dc}$ reaches zero volts and $I_{fault}$ decays from its peak as the voltage $V_{dc}$ stays at zero for a longer time. Further, the changes in the current $I_p$ and $I_s$ with respect to changes in the voltage $V_{dc}$ are observed to be low and being almost equal to zero.

Referring to FIG. 3D, the circuit 112 is configured to hold the fault current $I_{fault}$ at the peak level until the CB (i.e., CB 106B) clears the fault (such as the source 202B). The SCRs 306A and 306B turn OFF when the current in the circuit 112 decays to zero upon clearing the fault. In particular, the SCRs 306A and 306B are turned OFF since the SCRs 306A and 306B do not have additional commutation circuits to bias them when the current in the circuit 112 decays to zero. However, if the voltage of the grid 104 recovers from the fault before the CB 106B clears the fault, the grid voltage recovery may happen during the negative half cycle of AC phase voltage of the grid 104 resulting in the capacitor 308 being charged to a negative voltage suddenly.

Figure 3E:
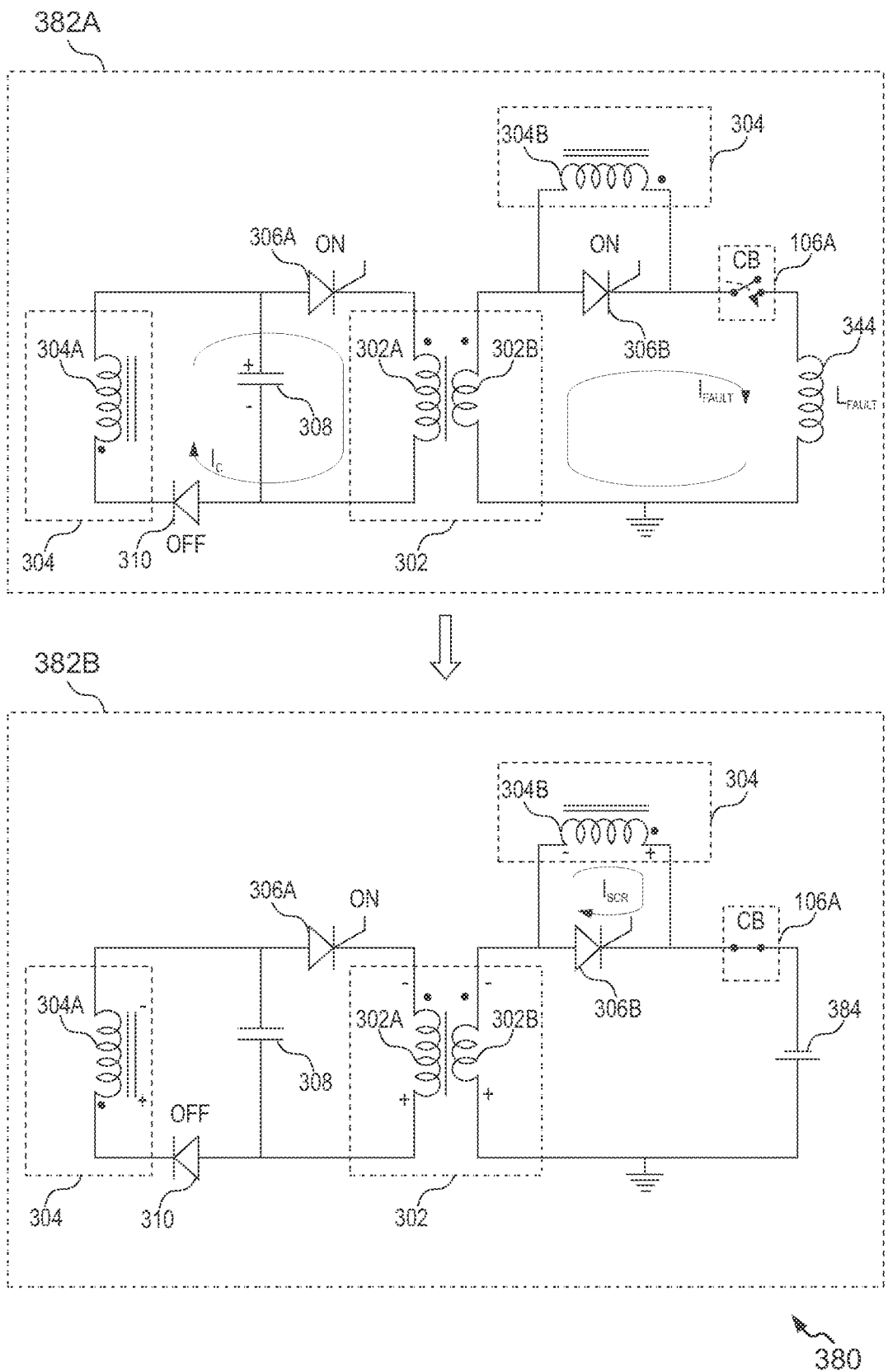
FIG. 3E illustrates the operation of the auxiliary circuit when the grid voltage recovers from the fault before the CB clears the fault, in accordance with an embodiment of the present disclosure.

FIG. 3E illustrates an operation 380 of the circuit 112 when the grid voltage recovers from the fault before the CB 106B clears the fault, in accordance with an embodiment of the present disclosure. FIG. 3E also shows an equivalent single-phase circuit diagram 382A corresponding to the circuit 112 showing operating states of one or more components of the circuit 112. FIG. 3E also shows another equivalent single-phase circuit diagram 382B corresponding to the circuit 112 showing equivalent representations of the operating states of the corresponding one or more components. Furthermore, FIG. 3E shows current flow through grid 104 and the capacitor 308 with appropriate directions when the grid voltage recovers from the fault before the CB 106B clears the fault.

It may be noted that the AC phase voltage of the grid 104 may recover before the CB 106B (not shown in FIG. 3E) clears the fault in cases such as where fuses at the fault location are open or the fault itself is momentary, etc. In the above cases, the recovery of the AC phase voltage of the grid 104 may happen when the grid voltage is in a negative half cycle which may lead to the capacitor 308 charging to a negative voltage abruptly. The grid 104 is replaced with a negative voltage DC source 384 in FIG. 3E for representative purposes. In such cases, the circuit 112 provides natural commutation to the SCR 306B by turning OFF the SCR 306B and isolating the capacitor 308. To that effect, the diode 310 gets forward biased when the grid voltage is in the negative half cycle making the entire grid voltage appear across the primary winding 304A. Therefore, a negative voltage may appear across the terminals of the SCR 306B since the SCR 306B is connected to the secondary winding 304B. The negative voltage across the terminals of the SCR 306B results in turning OFF the SCR 306B. After the SCR 306B is turned OFF, the current in the circuit 112 is reduced to the combined magnetizing currents of the transformers 302 and 304 which would eventually turn OFF the SCR 306A during current zero crossing.

Various embodiments of the disclosure, as discussed above, may be practiced with steps and/or operations in a different order, and/or with hardware elements in configurations, which are different from those which, are disclosed. Therefore, although the disclosure has been described based on these exemplary embodiments, it is noted that certain modifications, variations, and alternative constructions may be apparent and well within the spirit and scope of the disclosure.

Although various exemplary embodiments of the disclosure are described herein in a language specific to structural features and/or methodological acts, the subject matter defined in the appended claims is not necessarily limited to the specific features or acts described above. Rather, the specific features and acts described above are disclosed as exemplary forms of implementing the claims.

What is claimed is:

1. An auxiliary circuit to inject fault current into a grid receiving electrical power from one or more inverters associated with corresponding electrical power sources, the auxiliary circuit comprising:
   a pair of transformers comprising a first transformer and a second transformer;
   a pair of silicon-controlled rectifiers (SCRs) comprising a first SCR and a second SCR, each of the pair of SCRs is configured to be in an OFF state when alternating current (AC) voltage of the grid is in a normal range and each of the pair of SCRs is configured to be in an ON state when the AC voltage is in a fault range;
   a capacitor electrically connected between the first transformer, the second transformer, and the first SCR; and
   a diode biased by the second transformer and the capacitor to enable charging of the capacitor to a peak of the AC voltage during one polarity of the AC voltage when the AC voltage is in the normal range,
   wherein the capacitor is configured to discharge via the first SCR and the first transformer by injecting the fault current into the grid when the AC voltage is in the fault range,
   wherein each of the pair of transformers has a primary winding and a secondary winding, wherein the primary winding of the first transformer has a higher number of turns than the secondary winding of the first transformer, and wherein the primary winding of the second transformer has equal turns as the secondary winding of the second transformer.

2. The auxiliary circuit of claim 1, wherein the capacitor is electrically connected in parallel to a series connection of the first SCR and the primary winding of the first transformer, wherein the capacitor is further electrically connected in parallel to a series connection of the diode and the primary winding of the second transformer,
   wherein the second SCR is electrically connected in series with the secondary winding of the first transformer, a circuit breaker, and the grid, and
   wherein the secondary winding of the second transformer is in parallel connection with the second SCR.

3. The auxiliary circuit of claim 1, wherein the auxiliary circuit is connected to a node connecting a circuit breaker to an inverter of the one or more inverters configured to supply AC power to the grid.

4. The auxiliary circuit of claim 1, wherein a magnetizing inductance of the second transformer is higher than a magnetizing inductance of the first transformer such that voltage drop across the first transformer is lower allowing the capacitor to charge to the peak of the AC voltage and protecting the first transformer from magnetic saturation.

5. The auxiliary circuit of claim 1, wherein the auxiliary circuit is triggered by turning ON the first SCR and the second SCR by a triggering unit when the AC voltage drops to less than at least ten percent of a nominal voltage, and wherein the drop in the AC voltage of the grid is determined as a fault condition in which an electrical power source connected to the grid is determined to be faulty.

6. The auxiliary circuit of claim 5, wherein the second transformer is shorted and the diode turns OFF due to negative bias when the second SCR is turned ON.

7. The auxiliary circuit of claim 5, wherein the capacitor is connected to the grid through the first transformer and the grid is defined as an inductive element connected to ground when the fault condition occurs, and wherein the connection of the capacitor to the inductive element through the first transformer results in resonance between the capacitor and the inductive element.

8. The auxiliary circuit of claim 7, wherein a time period of the resonance is given by $$T_{Aux}=2*\pi*\sqrt{(C_{Aux}*L_{fault})}$$

where $T_{Aux}$ is the time period, $C_{Aux}$ is capacitance of the capacitor, and $L_{fault}$ is inductance of the inductive element.

9. The auxiliary circuit of claim 8, wherein a circuit breaker associated with a faulty electrical power source is tripped disconnecting the faulty electrical power source from the grid when the time period is greater than an instantaneous trip time setting of the circuit breaker associated with the faulty electrical power source, and wherein the circuit breaker associated with the faulty electrical power source is tripped when the time period is greater than at least four times the instantaneous trip time setting to trip the circuit breaker.

10. The auxiliary circuit of claim 9, wherein the time period reduces when the inductance reduces resulting in the capacitor discharging to zero volts, and the auxiliary circuit enters a second quarter cycle of the resonance during which the capacitor gets charged to a negative voltage.

11. The auxiliary circuit of claim 10, wherein the diode is turned ON connecting the secondary winding of the second transformer to the capacitor when a voltage across the capacitor is negative, thereby preventing the capacitor from charging to a further negative voltage.

12. The auxiliary circuit of claim 11, wherein the first transformer and the second transformer are connected in phase opposition resulting in a lesser voltage drop across the inductive element, and the fault current across the auxiliary circuit has a higher time to decay as the voltage drop across the inductive element is low, thereby resulting in holding the fault current a peak level until the circuit breaker clears the fault.

13. The auxiliary circuit of claim 12, wherein the first SCR and the second SCR are turned OFF when the fault current decays to zero upon the circuit breaker associated with the faulty electrical power source disconnecting the faulty electrical power source.

14. The auxiliary circuit of claim 13, wherein the capacitor starts to charge to a negative voltage during a negative half cycle of the AC voltage when the AC voltage recovers to the normal range before disconnecting the faulty electrical power source from the grid.

15. The auxiliary circuit of claim 14, wherein the second SCR is turned OFF when the capacitor starts to charge to the negative voltage, thereby isolating the capacitor from the grid.

16. The auxiliary circuit of claim 15, wherein the diode is forward biased during the negative half cycle of the AC voltage resulting in the AC voltage appearing across the primary winding of the second transformer and wherein the secondary winding of the second transformer is connected across the second SCR that is connected to the negative voltage resulting in turning OFF the second SCR.

17. The auxiliary circuit of claim 16, wherein a current across the auxiliary circuit reduces when the second SCR is turned OFF reducing a current of the first transformer that leads to the first SCR turning OFF.

18. An electrical network, comprising:
   a plurality of inverters, each of the plurality of inverters connected to a grid via a circuit breaker; an auxiliary circuit connected to a node connecting the circuit breaker to an inverter, the auxiliary circuit configured to inject fault current into the grid, and the auxiliary circuit comprising:

a pair of transformers comprising a first transformer and a second transformer;

a pair of silicon-controlled rectifiers (SCRs) comprising a first SCR and a second SCR, each of the pair of SCRs is configured to be in an OFF state when alternating current (AC) voltage of the grid is in a normal range and each of the pair of SCRs is configured to be in an ON state when the AC voltage is in a fault range;

a capacitor electrically connected between the first transformer, the second transformer, and the first SCR; and a diode biased by the second transformer and the capacitor to enable charging of the capacitor to a peak of the AC voltage during one polarity of the AC voltage when the AC voltage is in the normal range, wherein the capacitor is configured to discharge via the first SCR and the first transformer by injecting the fault current into the grid when the AC voltage is in the fault range; and a triggering unit configured to:
  detect a fault in the grid; and
  turn ON the pair of SCRs, the triggering unit electrically connected to the grid and the auxiliary circuit,
  wherein each of the pair of transformers has a primary winding and a secondary winding, wherein the primary winding of the first transformer has a higher number of turns than the secondary winding of the first transformer, and wherein the primary winding of the second transformer has equal turns as the secondary winding of the second transformer.

19. The electrical network of claim 18, wherein the triggering unit is configured to detect the fault in the grid when the AC voltage is in the fault range.

* * * * *